(12) United States Patent
Doushita et al.

(10) Patent No.: US 6,645,648 B2
(45) Date of Patent: Nov. 11, 2003

(54) MAGNETIC RECORDING MEDIUM COMPRISING A BACKCOAT LAYER HAVING SPECIFIC PROTRUSIONS

(75) Inventors: Hiroaki Doushita, Kanagawa (JP); Satoshi Matsubaguchi, Kanagawa (JP); Tetsuji Nishida, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/912,648

(22) Filed: Jul. 24, 2001

(65) Prior Publication Data

US 2002/0110705 A1 Aug. 15, 2002

(30) Foreign Application Priority Data

Jul. 24, 2000 (JP) .......................................... 2000-222699

(51) Int. Cl.$^7$ ................................................ G11B 5/735
(52) U.S. Cl. .......................... 428/694 BH; 428/694 BB; 428/694 SG
(58) Field of Search .................... 428/694 BH, 694 BB, 428/694 SG

(56) References Cited

U.S. PATENT DOCUMENTS 4,837,116 A * 6/1989 Arioka et al. ................ 428/141
5,922,483 A * 7/1999 Takahashi et al. ......... 428/694 B
6,074,724 A * 6/2000 Inaba et al. .................. 428/141
6,346,310 B1 * 2/2002 Naoe et al. .................. 428/141
6,432,503 B2 * 8/2002 Aonuma et al. ............. 428/65.3
6,444,290 B1 * 9/2002 Takahashi et al. ........... 428/141

\* cited by examiner

*Primary Examiner*—H. Thi Le
(74) *Attorney, Agent, or Firm*—Stroock & Stroock & Lavan LLP

(57) ABSTRACT

Provided is a magnetic recording medium having good electromagnetic characteristics, particularly both improved high-density recording characteristics and good durability, and particularly a C/N ratio that is markedly improved in the high-density recording region. A magnetic recording medium comprising a nonmagnetic lower layer and a magnetic layer provided in this order on a support wherein said magnetic layer comprises a ferromagnetic metal powder or a ferromagnetic hexagonal ferrite powder and a binder and has a coercive force equal to or higher than 143 kA/m. Said magnetic recording medium is a medium for recording signals having a surface recording density ranging from 0.2 to 2 Gbit/inch$^2$; said support has a thickness equal to or less than 5.5 $\mu$m and a Young's modulus in the MD direction equal to or higher than 11,000 Mpa; and said support has on the reverse surface from said magnetic layer a backcoat layer, said backcoat layer having not fewer than 200 and not more than 1,000 protrusions having a height equal to or higher than 50 nm per 10,000 $\mu$m$^2$.

6 Claims, No Drawings

MAGNETIC RECORDING MEDIUM COMPRISING A BACKCOAT LAYER HAVING SPECIFIC PROTRUSIONS

FIELD OF THE INVENTION

The present invention relates to a particulate magnetic recording medium of high recording density, and more particularly, to a magnetic recording medium for high-density recording having a magnetic layer and an essentially nonmagnetic underlayer, with the magnetic layer comprising a ferromagnetic metal powder or a hexagonal ferrite powder.

RELATED ART

As minicomputers, personal computers, work stations, and other office computers have become widespread in recent years, there has been significant research into magnetic tapes (so-called "backup tapes") for recording computer data as an external memory medium. As the magnetic tapes employed in these applications have been put to practical use, and particularly as computers have grown smaller and information processing capacity has increased, there has been strong demand for increased recording capacity to achieve high capacity and reduction in size.

In the past, magnetic recording media in which a magnetic layer comprising iron oxide, Co-modified iron oxide, $CrO_2$, a ferromagnetic metal powder, or a hexagonal ferrite powder dispersed in a binder is coated on a nonmagnetic support have been widely employed. Of these, ferromagnetic metal powders and hexagonal ferrite powders are known to have good high-density recording characteristics.

To improve the characteristics of a disk magnetic recording medium, the use of vinyl chloride resin having an acid group, epoxy group, and hydroxyl group is proposed in Japanese Unexamined Patent Publication (KOKAI) Showa No. 64-84418; the use of a metal powder with an Hc equal to or higher than 80 kA/m (1,000 Oe) and a specific surface area ranging from 25 to 70 $m^2/g$ is proposed in Japanese Examined Patent Publication (KOKOKU) Heisei No. 3-12374; and the incorporation of an abrasive to stabilize the magnetization level and specific surface area of the magnetic material is proposed in Japanese Examined Patent Publication (KOKOKU) Heisei No. 6-28106.

To improve the durability of the magnetic recording medium, the incorporation of a nonmagnetic powder with a Mohs' hardness equal to or higher than 6 and a higher fatty acid ester is proposed in Japanese Unexamined Patent Publication (KOKAI) Showa No. 54-124716; the setting of the volume of pores in a lubricant and the setting of the surface roughness to the range of 0.005 to 0.025 $\mu m$ is proposed in Japanese Examined Patent Publication (KOKOKU) Heisei No. 7-89407; the use of a low-melting-point fatty acid ester and an abrasive with a particle diameter of from one-fourth to three-fourths the thickness of the magnetic layer is proposed in Japanese Examined Patent Publication (KOKOKU) Heisei No. 7-36216; and the use of chromium oxide and a metal magnetic material comprising Al is proposed in Japanese Unexamined Patent Publication (KOKAI) Heisei No. 3-203018.

As the configuration of a magnetic recording medium having a nonmagnetic lower layer and intermediate layer, a configuration having an electrically conductive layer and a magnetic layer having a metal powder is proposed in Japanese Unexamined Patent Publication (KOKAI) Heisei No. 3-120613; a configuration having a magnetic layer equal to or lower than 1 $\mu m$ and a nonmagnetic layer is proposed in Japanese Unexamined Patent Publication (KOKAI) Heisei No. 6-290446; a configuration comprising an intermediate layer of carbon and a magnetic layer containing a lubricant is proposed in Japanese Unexamined Patent Publication (KOKAI) Showa No. 62-159337; and a configuration having a nonmagnetic layer with carbon of specified size is proposed in Japanese Unexamined Patent Publication (KOKAI) Heisei No. 5-290358.

As minicomputers, personal computers, and other office computers have become widespread in recent years, there has been significant research into magnetic tapes (so-called "backup tapes") for recording computer data as an external memory medium. As the magnetic tapes employed in these applications have been put to practical use, and particularly as computers have grown smaller and information processing capacity has increased, there has been strong demand for increased recording capacity to achieve high capacity and size reduction. Further, demand has increased for further improvement in magnetic tapes for use under a wide variety of environmental conditions (particularly conditions of sharp fluctuation in temperature and humidity) due to the varied environment in which these magnetic tapes are employed, as well as for reliable data storage, stable recording of data during high-frequency travel with repeated use at high speeds, and reliable performance in reading and the like.

Conventionally, the magnetic tapes employed in digital signal recording systems are determined by the system; there are known magnetic tapes corresponding to DLT-type, 3480, 3490, 3590, QIC, D8-type, and DDS-type systems. Irrespective of the system in which employed, a magnetic layer comprising a ferromagnetic powder, binder, and abrasive of single-layer structure with a relatively thick film thickness ranging from 2.0 to 3.0 $\mu m$ is provided on one side of a nonmagnetic support, and a backcoat layer for preventing tangled winding and ensuring good running durability is provided on the other side of the magnetic tape. However, in such magnetic layers of relatively thick single-layer structure, there is generally a problem in the form of loss due to thickness resulting in decreased output.

Thinning of the magnetic layer is known to afford improvement by reducing the drop in reproduction output caused by the thickness loss of the magnetic layer. For example, Japanese Unexamined Patent Publication (KOKAI) Heisei No. 5-182178 discloses a magnetic recording medium in which a lower nonmagnetic layer comprising an inorganic powder dispersed in resin is provided on a nonmagnetic support and an upper magnetic layer equal to or less than 1.0 $\mu m$ in thickness comprising a ferromagnetic powder dispersed in binder is provided over said nonmagnetic layer while said nonmagnetic layer is wet.

However, with the rapidly increasing capacity and high densification of magnetic recording media, it is difficult to achieve satisfactory characteristics with such technology. It has also been difficult to achieve durability simultaneously.

Accordingly, the object of the present invention is to provide a magnetic recording medium with improved electromagnetic characteristics, particularly improved high-density recording characteristics, combined with good durability, particularly a substantially improved C/N ratio in the high-density recording region.

The present inventors conducted extensive research into obtaining a magnetic recording medium with good electromagnetic characteristics and durability, and particularly, a markedly improved C/N ratio in the high-density recording region, resulting in the discovery that the good high-density recording characteristics and good durability targeted by the present invention were achieved by the medium set forth below; the present invention was devised on that basis.

SUMMARY OF THE INVENTION

That is, the present invention relates to a magnetic recording medium comprising a nonmagnetic lower layer and a magnetic layer provided in this order on a support wherein said magnetic layer comprises a ferromagnetic metal powder or a ferromagnetic hexagonal ferrite powder and a binder and has a coercive force equal to or higher than 143 kA/m, wherein said magnetic recording medium is a medium for recording signals having a surface recording density ranging from 0.2 to 2 Gbit/inch$^2$, said support has a thickness equal to or less than 5.5 $\mu$m and a Young's modulus in the MD direction equal to or higher than 11,000 Mpa, and said support has on the reverse surface from said magnetic layer a backcoat layer, said backcoat layer having not fewer than 200 and not more than 1,000 protrusions having a height equal to or higher than 50 nm per 10,000 $\mu$m$^2$.

The above-stated object of the present invention is achieved by making it possible in the magnetic recording medium of the present invention to maintain, without loss due to the effect of the protrusions present in the above-described backcoat layer, the good high-density recording characteristics obtained by the use of a magnetic layer in which a ferromagnetic metal powder or a ferromagnetic hexagonal ferrite powder is dispersed in a binder; by the use of a backcoat layer having not fewer than 200 and not more than 1,000 protrusions equal to or higher than 50 nm in height per 10,000 $\mu$m$^2$ to yield good running durability; and by the use of a support with a thickness equal to or less than 5.5 $\mu$m and a Young's modulus in the MD direction equal to or higher than 11,000 Mpa. Based on the present invention, both good high-density characteristics and good durability are combined, yielding a magnetic recording medium with a markedly improved C/N ratio in the high-density area and yielding computer tapes.

In the present invention, it is further desirable for the dry thickness of the magnetic layer to be in a range of from 0.05 to 0.25 $\mu$m, for $\Phi$m to be in a range of from $1.0 \times 10^{-5}$ to $1.3 \times 10^{-5}$T (from $8.0 \times 10^{-3}$ to $1.0 \times 10^{-3}$ emu/cm$^2$), and for the lower layer and/or the magnetic layer to comprise at least a fatty acid and a fatty acid ester to permit obtaining a magnetic recording medium with a markedly improved C/N ratio in the high-density recording area having both good high-density characteristics and good durability, previously impossible with prior art.

In the present invention, it is further desirable for the magnetic recording medium to record signals at a surface recording density ranging from 0.2 to 2 Gbit/inch$^2$, and for the lower layer to comprise an inorganic powder with a Mohs' hardness equal to or higher than 4 to improve durability during repeated run.

In the present specification, the term "nonmagnetic lower layer" includes a lower layer having magnetism of a degree not contributing to recording; this layer may be referred to hereinafter as simply the lower layer or nonmagnetic layer.

$\Phi$m refers to the magnitude of the magnetic moment capable of being directly measured at Hm 796 kA/m (10 kOe) with a vibrating sample magnetometer (VSM: from Toei Kogyo Co.,Ltd.) on one side of a magnetic layer of unit area; this is equal to the magnetic flux density Bm (unit: T (tesla)) obtained by VSM multiplied by the thickness (m). Thus, the unit of $\Phi$m is denoted as T·m.

The term "linear recording density" is the number of bits of signal recorded per inch in the recording direction.

The linear recording density, track density, and surface recording density are values determined by the system. That is, in improving the surface recording density in the present invention, the thickness of the magnetic layer and magnetic layer Hc are used to improve the linear recording density, and optimization of $\Phi$m is used to improve track density.

DETAILED EXPLANATION OF THE INVENTION

In the present invention, yielding a magnetic recording medium having both high-density characteristics in the form of a surface recording density ranging from 0.2 to 2 Gbit/inch$^2$ or even a surface recording density ranging from 0.35 to 2 Gbit/inch$^2$, as well as good running durability, and, in particular, yielding a computer tape, is the result of organically combining and integrating the following features.

The features of the present invention are (1) high Hc and ultra smoothness; (2) ensuring durability through improvement in multiple lubricants, a durable binder, and ferromagnetic powder; (3) an ultra thin magnetic layer and reduced variation in the interface between the magnetic layer and the lower layer; (4) high packing of powders (ferromagnetic powder, nonmagnetic powder); (5) making ultra fine particles of powders (ferromagnetic powder, nonmagnetic powder) with ultra fine particles; (6) stabilization of head touch; (7) improved durability through the combination of a backcoat layer and a support; (8) the effect of lubricants under high-temperature, low-temperature; and the like. The present invention was devised by suitably combining and integrating these features.

The present inventors conducted extensive research based on such knowledge. As a result, they obtained a magnetic recording medium, in particular, a computer tape, with both high-density characteristics in the form of a surface recording density ranging from 0.2 to 2 Gbit/inch$^2$, or even a surface recording density ranging from 0.35 to 2 Gbit/inch$^2$, and good durability, and in particular, a markedly improved C/N ratio in the high-density recording region.

That is, a support with a thickness equal to or less than 5.5 $\mu$m permits improved volume recording density that is a characteristics of a tape medium. For example, there is an advantage in that tapes of the length specified for DDS-4 cartridges can be wound. The lower limit of the thickness of the support is, for example, 3.0 $\mu$m from the viewpoint of affording comparative ease of mass production during film manufacturing. The thickness of the support is desirably within the range of from 3.5 to 5.0 $\mu$m. A Young's modulus in the MD direction of the support equal to or higher than 11,000 Mpa is advantageous in that it permits the maintaining of good electromagnetic characteristics without generating gaps between the magnetic head and the tape even when the support is thin. The upper limit of the Young's modulus in the MD direction of the support is, for example, 50,000 Mpa from the viewpoint of permitting the manufacture of a flexible film. The Young's modulus in the MD direction of the support is preferably within the range of from 14,000 to 20,000 Mpa.

Having fewer than 200 protrusions having a height equal to or less than 50 nm per 10,000 $\mu$m$^2$ in the backcoat layer is undesirable in that the friction coefficient during running becomes large and it becomes difficult to ensure durability. Having more than 1,000 pieces is undesirable in that the surface becomes rough, bumps (irregularities) are formed on the magnetic surface during tape winding, and the C/N ratio deteriorates. The number of protrusions having a height equal to or higher than 50 nm present in the backcoat layer desirably falls within the range of from 700 to 900 pieces per 10,000 $\mu m^2$.

When the coercive force of the magnetic layer is less than 143 kA/m (1,800 Oe), the C/N ratio is inadequate in the high-density recording that is the object of the present invention.

Further, in the present invention, having a magnetic layer dry thickness ranging from 0.05 to 0.25 $\mu m$ is desirable from the viewpoint of ensuring a window margin to improve recording demagnetization and overwrite characteristics. Further, having a $\Phi m$ ranging from $1.0 \times 10^{-5}$ to $1.3 \times 10^{-5}$ T (from $8.0 \times 10^{-3}$ to $1.0 \times 10^{-3}$ emu/cm$^2$) is desirable from the viewpoint of ensuring practically output. Further, having the lower layer and/or magnetic layer comprise at least a fatty acid or fatty acid ester is desirable from the viewpoint of ensuring running stability.

The magnetic recording medium of the present invention is comprised of an ATOMM configuration in which an essentially nonmagnetic lower layer and a magnetic layer comprising a ferromagnetic metal powder or a ferromagnetic hexagonal ferrite powder dispersed in a binder are provided in that order on a support. The advantages of the ATOMM configuration can be thought of as follows:

(1) Improved electromagnetic characteristics due to a thin layer structure of the magnetic layer.

(2) Improved durability due to stable supplying of lubricants.

(3) High output due to smoothing of the upper magnetic layer.

(4) Ease of imparting required functions due to functional separation on the magnetic surface.

These functions are not achieved by simply employing a multilayer magnetic layer. In the configuration of a multilayer structure, the "Sequential Layering Method" in which the layers are sequentially configured is generally employed. In this method, the lower layer is first applied, cured, or dried, after which the upper magnetic layer is similarly applied, cured, and surface treated.

Further, the following electromagnetic characteristics can be substantially improved by employing a thin magnetic layer structure (that is, a magnetic layer with a dry thickness ranging from 0.05 to 0.25 $\mu m$):

(1) Output in the high-frequency region can be improved by improving in characteristics during recording demagnetization.

(2) Overwriting characteristics can be improved.

(3) A window margin can be ensured.

Durability is an important element of the magnetic recording medium. Particularly, to achieve high transfer rates, ensuring durability of the medium when the magnetic head/internal cartridge parts and the medium are sliding at high-speed is an important problem. Means of improving the durability of the medium include controlling the binder formulation and surface roughness to increase the film strength of the medium itself, and the lubrication formulation to maintain slipperiness with the magnetic head. In the medium of the present invention, the three-dimensional network binder system that is currently performing well in the FD system is improved for use in the binder formulation.

Magnetic Layer

The upper and lower layers in the magnetic recording medium of the present invention can be manufactured by applying the lower layer, and while the lower layer is still wet (W/W), or once it has dried (W/D), applying the upper magnetic layer. Layers that are simultaneously or sequentially manufactured by wet application are preferred from the viewpoint of production efficiency, but application after drying is also entirely possible. Manufacturing the multilayer configuration (configuration comprising a lower nonmagnetic layer and an upper magnetic layer) by simultaneous or sequential wet application (W/W) permits the simultaneous formation of the upper layer/lower layer, making it possible to effectively apply a surface processing step such as a calendering step, and improving the surface roughness of even an ultra thin upper magnetic layer.

As stated above, the coercive force, Hc, of the magnetic layer is preferably equal to or higher than 143 kA/m (1,800 Oe). The ferromagnetic metal powder contained in the magnetic layer preferably has a Bm ranging from 200 to 500 mT (2,000 to 5,000 G), and the Bm of ferromagnetic hexagonal ferrite powders such as barium ferrite powder desirably ranges from 100 to 300 mT (1,000 to 3,000 G).

The Ferromagnetic Metal Powder

The metal ferromagnetic powder employed in the upper magnetic layer of the present invention is preferably a ferromagnetic metal powder chiefly comprising $\alpha$-Fe. In addition to prescribed atoms, the following atoms can be contained in the ferromagnetic metal powder: Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, and the like. The incorporation of at least one of the following in addition to $\alpha$-Fe is particularly desirable: Al, Si, Ca, Y, Ba, La, Nd, Co, Ni, and B. The incorporation of at least one from among Co, Y, and Al is still more desirable. The content of Co relative to Fe preferably ranges from 0 to 40 atomic percent, more preferably from 15 to 35 atomic percent, and still more preferably from 20 to 35 atomic percent. The content of Y preferably ranges from 1.5 to 12 atomic percent, more preferably from 3 to 10 atomic percent, and still more preferably from 4 to 9 atomic percent. The content of Al preferably ranges 1.5 to 12 atomic percent, more preferably from 3 to 10 atomic percent, and still more preferably from 4 to 9 atomic percent. The ferromagnetic powder may be pretreated prior to dispersion with dispersing agents, lubricants, surfactants, antistatic agents, and the like, described further below. Specific examples are described in Japanese Examined Patent Publication (KOKOKU) Showa Nos. 44-14090, 45-18372, 47-22062, 47-22513, 46-28466, 46-38755, 47-4286, 47-12422, 47-17284, 47-18509, 47-18573, 39-10307, and 46-39639; and U.S. Pat. Nos. 3,026,215, 3,031,341, 3,100,194, 3,242,005, and 3,389,014.

The ferromagnetic metal powder may contain a small quantity of hydroxide or oxide. Ferromagnetic alloy powders obtained by known manufacturing methods may be employed. The following methods are examples: methods of reduction with compound organic acid salts (chiefly oxalates) and reducing gases such as hydrogen; methods of reducing iron oxide with a reducing gas such as hydrogen to obtain Fe or Fe—Co particles or the like; methods of thermal decomposition of metal carbonyl compounds; methods of reduction by addition of a reducing agent such as sodium boron hydride, hypophosphite, or hydrazine to an aqueous solution of ferromagnetic metal; and methods of obtaining powder by vaporizing a metal in a low-pressure inert gas. The ferromagnetic alloy powders obtained in this manner may be subjected to any of the known slow oxidation treatments, such as immersion in an organic solvent followed by drying; the method of immersion in an organic solvent followed by formation of an oxide film on the surface by feeding in an oxygen-containing gas, then drying;

and the method of forming an oxide film on the surface by adjusting the partial pressure of oxygen gas and a inert gas without using an organic solvent.

The specific surface area as measured by the BET method of the ferromagnetic metal powder contained in the magnetic layer of the present invention ranges from 45 to 80 $m^2/g$, preferably from 50 to 70 $m^2/g$. At 45 $m^2/g$ and above, noise can be dropped, and at 80 $m^2/g$ and below, surface properties become easier to attain. The crystalline size of the ferromagnetic metal powder of the magnetic layer of the present invention ranges 80 to 180 Å, preferably from 100 to 180 Å, and still more preferably, from 110 to 175 Å. The major axis diameter of the ferromagnetic metal powder ranges from 0.01 to 0.25 µm, preferably from 0.03 to 0.15 µm, and more preferably from 0.03 to 0.12 µm. The acicular ratio of the ferromagnetic metal powder preferably ranges from 3 to 15, more preferably from 5 to 12. The σs of the ferromagnetic metal powder ranges from 100 to 180 A·$m^2$/kg, preferably from 110 to 170 A·$m^2$/kg, and more preferably from 125 to 160 A·$m^2$/kg. The coercive force of the metal powder is preferably equal to or higher than 143 kA/m (1,800 Oe) and equal to or less than 279 kA/m (3,500 Oe), preferably equal to or higher than 143 kA/m (1,800 Oe) and equal to or less than 239 kA/m (3,000 Oe).

The moisture content of the ferromagnetic metal powder preferably ranges from 0.01 to 2 percent. The moisture content of the ferromagnetic powder is desirably optimized based on the type of binder. The pH of the ferromagnetic powder is desirably optimized based on the combination with the binder. The pH range is from 4 to 12, preferably from 6 to 10. The ferromagnetic metal powder can be surface treated as needed with Al, Si, P or an oxide thereof. The quantity thereof ranges from 0.1 to 10 percent with respect to the ferromagnetic metal powder. A surface treatment is preferably applied, because the adsorption of lubricants such as fatty acids becomes equal to or less than 100 mg/$m^2$. There are cases where soluble Na, Ca, Fe, Ni, Sr, and other inorganic ions are incorporated into the ferromagnetic metal powder. It is basically desirable that these not be present, but they seldom affect characteristics at less than 200 ppm. Further, the ferromagnetic powder employed in the present invention desirably has few pores, with the quantity thereof preferably being equal to or less than 20 volume percent, more preferably, equal to or less than 5 volume percent. The shape may be acicular, rice-particle shaped, or spindle-shaped so long as the above-stated characteristics are satisfied for the size of the particles. A low SFD of the ferromagnetic powder itself is desirable, with 0.8 or less being preferred. It is necessary to narrow the distribution of the Hc of the ferromagnetic powder. When the SFD is equal to or less than 0.8, electromagnetic characteristics are good, output is high, magnetization reversal is sharp, and there are few peak shifts; this level is suited to high density digital magnetic recording. Methods of narrowing Hc distribution include improving the particle size distribution of the goethite in the ferromagnetic metal powder and preventing sintering.

Ferromagnetic Hexagonal Ferrite Powder

Substitution products of barium ferrite, strontium ferrite, lead ferrite, and calcium ferrite, Co substitution products or the like can be employed as the hexagonal ferrite particles contained in the magnetic layer of the present invention. Specific examples are magnetoplumbite-type barium ferrite and strontium ferrite, as well as magnetoplumbite type ferrite, the particle surface of which is covered with spinels, and magnetoplumbite-type barium ferrite and strontium ferrite partly containing a spinel phase. The following may be incorporated in addition to other prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, and the like. Compounds to which elements such as Co—Zn, Co—Ti, Co—Ti—Zr, Co—Ti—Zn, Ni—Ti—Zn, Nb—Zn—Co, Sb—Zn—Co, Nb—Zn have been added may also be employed in general. Particular impurities are also sometimes incorporated based on the starting materials and manufacturing method.

The particle size for hexagonal plates ranges from 10 to 200 nm, preferably from 10 to 100 nm, and more preferably from 10 to 80 nm. Particularly when conducting reproduction with a magnetic resistance head to improve track density, it is important to reduce noise, and a plate diameter equal to or less than 40 nm is desirable. However, a plate diameter equal to or less than 10 nm is undesirable because stable magnetization is difficult to achieve due to thermal fluctuation. At a hexagonal plate diameter equal to or less than 200 nm, noise is low and high-density recording magnetic recording is facilitated. A plate ratio (plate diameter/plate thickness) ranging from 1 to 15 is desirable, and that ranging from 1 to 7 is preferred. A low plate ratio is undesirable because packing in the magnetic layer increases, making it difficult to achieve adequate orientation. Noise does not increase due to stacking between particles at a plate ratio equal to or less than 15.

The specific surface area of the particles of the above-stated particle size ranges from 10 to 200 $m^2/g$ as measured by BET. The specific surface area almost corresponds to an arithmetic value calculated from the particle plate diameter and the plate thickness. A narrow distribution of the particle plate diameter and plate thickness is usually preferred. Although conversion to numerical values is difficult, comparison is possible by randomly measuring 500 particles in a TEM photograph of particles. Although the distribution is often not a normal distribution, when calculated and denoted as the standard deviation to the average size, it is given by σ/mean size=0.1 to 2.0. To achieve a sharp particle size distribution, the particle-producing reaction system is rendered as uniform as possible and the particles produced may be subjected to a distribution-enhancing treatment. For example, one known method is the graded dissolution of ultra fine particles in an acid solution.

The hexagonal ferrite microparticles can be produced so that the coercive force Hc measured for the magnetic material ranges about from 40 kA/m(500 Oe) to 398 kA/m (5,000 Oe). A high Hc is advantageous for high-density recording, but the Hc is limited by the capacity of the recording head. In the present invention, the Hc ranges about from 143 kA/m (1,800 Oe) to 318 kA/m (4,000 Oe), preferably from 143 kA/m (1,800 Oe) to 279 kA/m (3,500 Oe). When the saturation magnetization of the head exceeds 1.4 tesla, 159 kA/m (2,000 Oe) or more is preferred. The Hc can be controlled through the particle size (plate diameter, plate thickness), type and quantity of elements contained, substitution site of elements, and conditions under which the particle generating reaction is conducted. Saturation magnetization σs ranges from 40 to 80 A·$m^2$/kg. A high σs is desirable, but tends to decrease the smaller the particles become. The compounding of spinel ferrite onto magnetoplumbite ferrite and the selection of the type and addition quantity of elements contained are well known means of improving σs. It is also possible to use W-type hexagonal ferrite.

The magnetic material particle surface is treated with a dispersion medium or substance suited to the polymer in the course of dispersing the magnetic material (hexagonal ferrite). An inorganic compound or organic compound can be employed as the surface treatment material. Compounds of Si, Al, P or the like, various silane coupling agents and titanium coupling agents are examples of the compounds. The quantity ranges from 0.1 to 10 percent with respect to the magnetic material. The pH of the magnetic material is also important to dispersion. The pH usually ranges about from 4 to 12 and optimum value depends on the dispersion medium and polymer, but a pH ranging about from 6 to 11 is selected for the chemical stability and storage properties of the medium. Moisture contained in the magnetic material also affects dispersion. Although there is an optimal value for the dispersion medium and polymer, 0.01 to 2.0 percent is normally selected. Methods of manufacturing hexagonal ferrite include: (1) a glass crystallization method consisting of mixing barium oxide, iron oxide, and an oxide of metal substituting for Fe and boron oxide and the like as a glass formation substance into a desired ferrite composition; quickly cooling the mixture to obtain an amorphous material; reheating the amorphous material; and refining and comminuting the product to obtain a barium ferrite crystal powder; (2) a hydrothermal reaction method consisting of neutralizing a barium ferrite composition metal salt solution with an alkali; removing the by-products; heating the liquid phase to 100° C. or greater; and washing, drying, and comminuting the product to obtain barium ferrite crystal powder; and (3) a coprecipitation method consisting of neutralizing a barium ferrite composition metal salt solution with an alkali; removing the by-products; drying the product and processing it at equal to or less than 1,100° C.; and comminuting the product to obtain barium ferrite crystal powder. However, any other methods may be used in the present invention.

The Nonmagnetic Layer

The contents of the lower layer (nonmagnetic layer) will be described next in detail. The lower layer of the present invention is essentially nonmagnetic. Inorganic powders suitable for use are nonmagnetic powders. For example, they can be selected from inorganic compounds such as metal oxides, metal carbonates, metal sulfates, metal nitrides, metal carbides, metal sulfides, and other inorganic compounds. Examples of inorganic compounds are α-alumina having an α-conversion rate equal to or higher than 90 percent, β alumina, γ-alumina, θ-alumina, silicon carbide, chromium oxide, cerium oxide, α-iron oxide, hematite, gertite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide; these may be employed singly or in combination. Particularly desirable due to their narrow particle distribution and numerous means of imparting functions are titanium dioxide, zinc oxide, iron oxide, and barium sulfate. Even more preferred are titanium dioxide and α-iron oxide. The particle size of these nonmagnetic powders preferably ranges from 0.005 to 2 $\mu$m, but nonmagnetic powders of differing particle size may be combined as needed, or the particle diameter distribution of a single nonmagnetic powder may be broadened to achieve the same effect. What is preferred most is a particle size in the nonmagnetic powder ranging from 0.01 to 0.2 $\mu$m. Particularly when the nonmagnetic powder is a granular metal oxide, a mean particle diameter equal to or less than 0.08 $\mu$m is preferred, and when an acicular metal oxide, a major axis length equal to or less than 0.3 $\mu$m is preferred, with a particle size equal to or less than 0.2 $\mu$m being even more preferable. The tap density ranges from 0.05 to 2 g/mL, preferably from 0.2 to 1.5 g/mL.

The moisture content of the nonmagnetic powder ranges from 0.1 to 5 weight percent, preferably from 0.2 to 3 weight percent, and still more preferably from 0.3 to 1.5 weight percent. The pH of the nonmagnetic power ranges from 2 to 11, with a pH range of from 5.5 to 10 being particularly desirable. The specific surface area of the nonmagnetic powder ranges from 1 to 100 m$^2$(g, preferably from 5 to 80 m$^2$/g, and still more preferably from 10 to 70 m$^2$/g. The crystalline particle size of the nonmagnetic powder ranges from 0.004 to 1 $\mu$m, preferably from 0.04 to 0.1 $\mu$m. Dibutyl phthalate (DBP) oil absorption amount ranges from 5 to 100 mL/100 g, preferably from 10 to 80 mL/100 g, and still more preferably from 20 to 60 mL/100 g. The specific gravity ranges from 1 to 12, preferably from 3 to 6. The shape may be acicular, spherical, polyhedral, or tabular. A powder with a Mohs' hardness equal to or higher than 4 and equal to or less than 10 is preferred. The SA (stearic acid) absorption level of the nonmagnetic powder ranges from 1 to 20 $\mu$mol/m$^2$, preferably from 2 to 15 $\mu$mol/m$^2$, and more preferably from 3 to 8 $\mu$mol/m$^2$. The pH is preferably between 3 and 6. The surfaces of these nonmagnetic powders are preferably treated so that $Al_2O_3$, $SiO_2$, $TiO_2$, $ZrO_2$, $SnO_2$, $Sb_2O_3$, $ZnO$, and $Y_2O_3$ are present. $Al_2O_3$, $SiO_2$, $TiO_2$, and $ZrO_2$ have particularly desirable dispersion properties. $Al_2O_3$, $SiO_2$, and $ZrO_2$ are even more preferred. These may be employed singly or in combination. Depending on the objective, a coprecipitated surface-treated layer may be employed; the outer layer may be first treated with alumina and then with silica, or the reverse method may be adopted. Depending on the object, the surface treated layer may be a porous layer, but homogeneity and density are generally desirable.

Specific examples of nonmagnetic powders suitable for use in the lower layer of the present invention are: Nanotite from Showa Denko K.K.; HIT-100 and ZA-G1 from Sumitomo Chemical Co.,Ltd.; α-hematite DPN 250, DPN-250BX, DPN-245, DPN-270BX, DPN-500BX, DBN-SA1, and DBN-SA3 from Toda Kogyo Corp.; titanium oxide TTO-51B, TTO-55A, TTO-55B, TTO-55C, TTO-55S, TTO-55D, SN-100, α-hematite E270, E271, E300, and E303 from Ishihara Sangyo Co.,Ltd.; titanium oxide STT-4D, STT-30D, STT-30, STT-65C, and α-hematite α-40 from Titan Kogyo K.K.; MT-100S, MT-100T, MT-150W, MT-500B, MT-600B, MT-100F, and MT-500HD from Tayca Corporation; FINEX-25, BF-1, BF-10, BF-20, and ST-M from Sakai Chemical Industry Co.,Ltd.; DEFIC-Y and DEFIC-R from Dowa Mining Co.,Ltd.; AS2BM and TiO2P25 from Nippon Aerosil Co.,Ltd.; 100A and 500A from Ube Industries Co.,Ltd.; and sintered products of the same. Titanium dioxide and iron α-oxide are the nonmagnetic powders of preference.

Mixing carbon black into the lower layer achieves the known effects of lowering surface resistivity Rs and reducing light transmittance, as well as yielding the desired ricro Vickers hardness. Further, the incorporation of carbon black into the lower layer can also serve to store lubricants. Examples of types of carbon black that are suitable for use are furnace black for rubber, thermal for rubber, black for coloring, and acetylene black. Based on the effect desired, the following characteristics can be optimized in the carbon black in the lower layer, and effects can be achieved by using different carbon blacks in combination.

The specific surface area of the carbon black in the lower layer ranges from 100 to 500 m$^2$/g, preferably from 150 to 400 m$^2$/g. DBP oil absorption amount ranges from 20 to 400 mL/100 g, preferably from 30 to 400 mL/100 g. The particle diameter of the carbon black ranges from 5 to 80 nm, preferably from 10 to 50 nm, and more preferably from 10 to 40 nm. The preferred pH of the carbon black ranges from 2 to 10, a moisture content ranges from 0.1 to 10 percent, and a tap density ranges from 0.1 to 1 g/mL. Specific examples of types of carbon black suitable for use in the present invention are: BLACK PEARLS 2000, 1300, 1000, 900, 800, 880, 700 and VULCAN XC-72 from Cabot Corporation; #3050B, #3150B, #3250B, #3750B, #3950B, #950, #650B, #970B, #850B, MA-600, MA-230, #4000, and #4010 from Mitsubishi Chemical Corp.; CONDUCTEX SC, RAVEN 8800, 8000, 7000, 5750, 5250, 3500, 2100, 2000, 1800, 1500, 1255, and 1250 from Columbia Carbon Co., Ltd.; and Ketjen Black EC from Lion Akzo Co.,Ltd. The carbon black employed can be surface treated with a dispersing agent or the like, grafted with a resin, or a portion of the surface may be graphite-treated. Further, the carbon black may be dispersed with a binder prior to being added to the coating material. These types of carbon black are employed in a range that does not exceed 50 weight percent of the inorganic powder and does not exceed 40 percent of the total weight of the nonmagnetic layer. These types of carbon black may be employed singly or in combination. The *Carbon Black Handbook* compiled by the Carbon Black Association may be consulted for types of carbon black suitable for use in the present invention.

Based on the object, an organic powder may be added to the lower layer. Examples are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed.

The binder resins, lubricants, dispersing agents, additives, solvents, dispersion methods, and the like described below for use in the magnetic layer may be applied to the lower layer. In particular, known techniques employed for the magnetic layer can be applied to the type and quantity of binder resin and the type and quantity of additives and dispersing agents that are added.

Binder

Conventionally known thermoplastic resins, thermosetting resins, reactive resins and mixtures thereof may be employed as binders in the magnetic layer and lower layer (nonmagnetic layer) of the present invention. Preferred thermoplastic resins have a glass transition temperature ranging from −100 to 150° C., a number average molecular weight ranging from 1,000 to 200,000, preferably from 10,000 to 100,000, and a polymerization degree ranging about from 50 to 1,000.

Examples of such thermoplastic resins are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins. Examples of thermosetting resins and reactive resins are phenol resins, epoxy resins, polyurethane cured resins, urea resins, melanine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. These resins are described in detail in the *Handbook of Plastics* published by Asakura Shoten. It is also possible to employ known electron radiation curing resins in individual layers. Examples thereof and methods of manufacturing the same are described in Japanese Unexamined Patent Publication (KOKAI) Showa No. 62-256219. The above-listed resins may be used singly or in combination. Preferred resins are combinations of polyurethane resin and at least one member selected from the group consisting of vinyl chloride resin, vinyl chloride—vinyl acetate copolymers, vinyl chloride—vinyl acetate—vinyl alcohol copolymers, and vinyl chloride—vinyl acetate—maleic anhydride copolymers, as well as combinations of the same with polyisocyanate.

Known structures of polyurethane resin can be employed, such as polyester polyurethane, polyether polyurethane, polyether polyester polyurethane, polycarbonate polyurethane, polyester polycarbonate polyurethane, and polycaprolactone polyurethane. To obtain better dispersability and durability in all of the binders set forth above, it is desirable to introduce by copolymerization or addition reaction at least one or more polar groups selected from among —COOM, —SO$_3$M, —OSO$_3$M, —P=O(OM)$_2$, —O—P=O(OM)$_2$ (where M denotes a hydrogen atom or an alkali metal base), —OH, —NR$_2$, —N$^+$R$_3$ (where R denotes a hydrocarbon group), an epoxy group, —SH, and —CN. The quantity of the polar group ranges from $10^{-1}$ to $10^{-8}$ mol/g, preferably from $10^{-2}$ to $10^{-6}$ mol/g.

Specific examples of the binders employed in the present invention are VAGH, VYHH, VMCH, VAGF, VAGD, VROH, VYES, VYNC, VMCC, XYHL, XYSG, PKHH, PKHJ, PKHC, and PKFE from Union Carbide Corporation.; MPR-TA, MPR-TA5, MPR-TAL, MPR-TSN, MPR-TMF, MPR-TS, MPR-TM, and MPR-TAO from Nisshin Chemical Industry Co.,Ltd.; 1000W, DX80, DX81, DX82, DX83, and 100FD from Denki Kagaku Kogyo K.K.; MR-104, MR-105, MR110, MR100, MR555, and 400X-110A from Nippon Zeon Co.,Ltd.; Nipporan N2301, N2302, and N2304 from Nippon Polyurethane Industry Co.,Ltd.; Pandex T-5105, T-R3080, T-5201, Bumock D-400, D-210-80, Crisvon 6109, and 7209 from Dainippon Ink And Chemicals, Incorporated.; Vylon UR8200, UR8300, UR-8700, RV530, and RV280 from Toyobo Co.,Ltd.; Daipheramine 4020, 5020, 5100, 5300, 9020, 9022, and 7020 from Dainichiseika Color & Chemicals Mfg. Co., Ltd.; MX5004 from Mitsubishi Chemical Corp.; Sunprene SP-150 from Sanyo Chemical Industries, Ltd.; and Salan F310 and F210 from Asahi Chemical Industry Co.,Ltd.

The binder employed in the nonmagnetic layer and magnetic layer of the present invention is employed in a range of from 5 to 50 percent, preferably from 10 to 30 percent, relative to the nonmagnetic powder or magnetic powder. Vinyl chloride resin, polyurethane resin, and polyisocyanate are preferably combined within the ranges of: from 5 to 30 percent for vinyl chloride resin, when employed; from 2 to 20 percent for polyurethane resin, when employed; and from 2 to 20 percent for polyisocyanate. However, when a small amount of dechlorination causes head corrosion, for example, it is also possible to employ polyurethane alone, or employ polyurethane and isocyanate alone. In the present invention, when polyurethane is employed, a glass transition temperature ranging from −50 to 150° C., preferably from 0 to 100° C., an elongation at break ranging from 100 to 2,000 percent, a stress at break ranging from 0.05 to 10 kg/mm$^2$, and a yield point ranging from 0.05 to 10 kg/mm$^2$ are desirable.

The magnetic recording medium of the present invention comprises at least two layers. Accordingly, the quantity of binder; the quantity of vinyl chloride resin, polyurethane resin, polyisocyanate, or some other resin in the binder; the molecular weight of each of the resins forming the magnetic layer; the quantity of polar groups; and the physical characteristics of the above-described resins can naturally be different in the nonmagnetic layer and the magnetic layer as required. These should be optimized in each layer. Known techniques may be applied for a multilayered magnetic layer. For example, when the quantity of binder is different in each layer, increasing the quantity of binder in the magnetic layer effectively decreases scratching on the surface of the magnetic layer. To achieve good touch to the head, the quantity of binder in the nonmagnetic layer can be increased to impart flexibility.

Examples of polyisocyanates employed in the present invention are tolylene diisocyanate, 4,4'-diphenylmethane diisocyanate, hexamethylene diisocyanate, xylylene diisocyanate, napthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co.,Ltd.; Takenate D-102, Takenate D-110N, Takenate D-200 and Takenate D-202 manufactured by Takeda Chemical Industries Co. Ltd.; and Desmodule L, Desmodule IL, Desmodule N and Desmodule HL manufactured by Sumitomo Bayer Co., Ltd. They can be used singly or in combinations of two or more in all layers by exploiting differences in curing reactivity.

Carbon Black and Abrasives

Examples of types of carbon black that are suitable for use in the magnetic layer of the present invention are: furnace black for rubber, thermal for rubber, black for coloring, and acetylene black. A specific surface area ranging from 5 to 500 $m^2$/g, a DBP oil absorption amount ranging from 10 to 400 mL/100 g, a particle diameter ranging from 5 nm to 300 nm, a pH ranging from 2 to 10, a moisture content ranging from 0.1 to 10 percent, and a tap density ranging from 0.1 to 1 g/cc are desirable. Specific examples of types of carbon black employed in the present invention are: BLACK PEARLS 2000, 1300, 1000, 900, 905, 800, 700 and VULCAN XC-72 manufactured by Cabot Corporation; #80, #60, #55, #50 and #35 manufactured by Asahi Carbon Co.,Ltd.; #2400B, #2300, #900, #1000, #30, #40 and #10B manufactured by Mitsubishi Chemical Corp.; CONDUCTEX SC, RAVEN 150, 50, 40 and 15, and RAVEN-MT-P, manufactured by Columbia Carbon Co. Ltd.; and Ketjen Black EC manufactured by Nippon EC Co.,Ltd. The carbon black employed may be surface-treated with a dispersant or grafted with resin, or have a partially graphite-treated surface. The carbon black may be dispersed in advance into the binder prior to addition to the magnetic coating material. These carbon blacks may be used singly or in combination. When employing carbon black, the quantity preferably ranges from 0.1 to 30 weight percent of the magnetic material. Carbon black works to prevent static, reduce the friction coefficient, impart light-blocking properties, enhance film strength, and the like in the magnetic layer; the properties vary with the type of carbon black employed. Accordingly, the type, quantity, and combination of carbon blacks employed in the present invention may be determined separately for the upper magnetic layer and the lower nonmagnetic layer based on the objective and the various characteristics stated above, such as particle size, oil absorption amount, electrical conductivity, and pH, and should naturally be optimized for each layer. For example, the *Carbon Black Handbook* compiled by the Carbon Black Association may be consulted for types of carbon black suitable for use in the magnetic layer of the present invention.

Known materials with a Mohs' hardness equal to or higher than 6, chiefly α-alumina having an α-conversion rate equal to or higher than 90 percent, β-alumina, silicon carbide, chromium oxide, cerium oxide, α-iron oxide, corundum, artificial diamond, silicon nitride, silicon carbide, titanium carbide, titanium oxide, silicon dioxide, and boron nitride, may be used singly or in combination as abrasives in the present invention. Further, a composite comprising two or more of these abrasives (an abrasive obtained by surface-treating one abrasive with another) may also be used. Although these abrasives may contain compounds and elements other than the main component or element in some cases, the same effect is obtainable if the content of the main component comprises equal to or higher than 90 weight percent. The particle size of these abrasives preferably ranges from 0.01 to $2\mu$, and a narrow particle size distribution is particularly desirable to improve electromagnetic characteristics. As needed to improve durability, abrasives of differing particle size may be combined or the same effect may be achieved by broadening the particle diameter distribution of a single abrasive. A tap density ranging from 0.3 to 2 g/cc, a moisture content ranging from 0.1 to 5 weight percent, a pH ranging from 2 to 11, and a specific surface area ranging from 1 to 30 $m^2$/g are desirable. The abrasive employed in the present invention may be acicular, spherical, or cubic in shape, but shapes that are partially angular have good abrasion properties and are thus preferred. Specific examples of abrasives employed in the present invention are: AKP-12, AKP-15, AKP-20, AKP-30, AKP-50, HIT-20, HIT-30, HIT-55, HIT-60A, HIT-70, HIT-80, and HIT-100 manufactured by Sumitomo Chemical Co.,Ltd.; ERC-DBM, HP-DBM, and HPS-DBM manufactured by Reynolds Co.; WA10000 manufactured by Fujimi Abrasive Co.; UB 20 manufactured by Kamimura Kogyo K.K.; G-5, Chromex U2, and Chromex U1 manufactured by Nippon Chemical Industrial Co.,Ltd.; TF100 and TF140 manufactured by Toda Kogyo Corp.; Beta Random Ultrafine manufactured by Ibidene Co.,Ltd.; and B-3 manufactured by Showa Kogyo Co.,Ltd. As needed, these abrasives may be added to the nonmagnetic layer. Addition to the nonmagnetic layer makes it possible to control surface shape and control how the abrasive protrudes. The particle diameter and quantity of abrasive added to the magnetic layer and nonmagnetic layer must be optimally established.

Additives

Substances having lubricating effects, antistatic effects, dispersive effects, plasticizing effects, or the like may be employed as additives in the magnetic layer and nonmagnetic layer of the present invention. In particular, at least a fatty acid and a fatty acid ester must be incorporated into the lower layer and/or magnetic layer of the present invention, and the fatty acid residues of the fatty acid and fatty acid ester must be identical. Examples of fatty acids are monobasic fatty acids having 10 to 24 carbon atoms (which may contain an unsaturated bond or may be branched). Examples of fatty acid esters are monofatty acid esters, difatty acid esters, or trifatty acid esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 12 carbon atoms (which may contain an unsaturated bond or be branched); and fatty esters of monoalkyl ethers of alkylene oxide polymers. Additives other than these fatty acids and fatty acid esters that are suitable for use include molybdenum disulfide; tungsten graphite disulfide; boron nitride; graphite fluoride; silicone oils; silicones having a polar group; fatty acid-modified silicones; fluorine-containing silicones; fluorine-containing alcohols; fluorine-containing esters; polyolefins; polyglycols; alkylphosphoric esters and their alkali metal salts; alkylsulfuric esters and their alkali metal salts; polyphenyl ethers; phenylphosphonic acid; α-naphthylphosphoric acid; phenylphosphoric acid; diphenylphosphoric acid; p-ethylbenzenephosphonic acid; phenylphosphinic acid; aminoquinones; various silane coupling agents and titanium coupling agents; fluorine-containing alkyl sulfuric acid esters and their alkali metal salts; metal salts (such as Li, Na, K, and Cu) of monobasic fatty acids (which may contain an unsaturated bond or-be branched) having 10 to 24 carbon atoms; monohydric, dihydric, trihydric, tetrahydric, pentahydric or hexahydric alcohols with 12 to 22 carbon atoms (which may contain an unsaturated bond or be branched); alkoxy alcohols with 12 to 22 carbon atoms; fatty acid amides with 8 to 22 carbon atoms; and aliphatic amines with 8 to 22 carbon atoms.

Specific examples of these fatty acids are: capric acid, caprylic acid, lauric acid, myristic acid, palmitic acid, stearic acid, behenic acid, oleic acid, elaidic acid, linolic acid, linolenic acid, and isostearic acid. Examples of fatty acid esters are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, neopentylglycol didecanoate, and ethylene glycol dioleyl. Examples of alcohols are oleyl alcohol, stearyl alcohol, and lauryl alcohol. It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, or sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines. Details of these surfactants are described in *A Guide to Surfactants* (published by Sangyo Tosho Co.,Ltd.). These lubricants, antistatic agents and the like need not be 100 percent pure and may contain impurities, such as isomers, unreacted material, by-products, decomposition products and oxides in addition to the main components. These impurities preferably comprise equal to or less than 30 weight percent, and more preferably equal to or less than 10 percent, by weight.

The lubricants and surfactants employed in the present invention each have different physical effects. The type, quantity, and combination ratio of lubricants producing synergistic effects are optimally set for a given objective. It is conceivable to control bleeding onto the surface through the use of fatty acids having different melting points in the nonmagnetic layer and the magnetic layer; to control bleeding onto the surface through the use of esters having different boiling points, melting points, and polarity; to improve the stability of coatings by adjusting the quantity of surfactant; and to increase the lubricating effect by increasing the amount of lubricant added to an intermediate layer. The present invention is not limited to these examples. Generally, a total quantity of lubricant ranging from 0.1 to 50 percent, preferably from 2 to 25 percent, of the magnetic powder or nonmagnetic powder is selected.

All or some of the additives used in the present invention may be added at any stage in the process of manufacturing the magnetic and nonmagnetic coating solutions. For example, they may be mixed with the magnetic material before a kneading step; added during a step of kneading the magnetic material, the binder, and the solvent; added during a dispersing step; added after dispersing; or added immediately before coating. Part or all of the additives may be applied by simultaneous or sequential coating after the magnetic layer has been applied to achieve a specific purpose. Depending on the objective, the lubricant may be coated on the surface of the magnetic layer after calendering or making slits.

Known organic solvents may be employed in the present invention. Examples are the solvents described in Japanese Unexamined Patent Publication (KOKAI) Showa No. 6-68453.

Layer Structure

In the thickness structure of the magnetic recording medium of the present invention, the nonmagnetic support is equal to or less than 5.5 $\mu$m, preferably equal to or less than 3.0, and still more preferably, within the range of from 3.5 to 5.0 $\mu$m.

An undercoating layer may be provided to improve adhesion between the nonmagnetic flexible support and the nonmagnetic layer or magnetic layer. The thickness of the undercoating layer ranges from 0.01 to 0.5 $\mu$m, preferably from 0.02 to 0.5 $\mu$m. Even though the present invention is normally a two-sided magnetic layer disk medium on which a nonmagnetic layer and a magnetic layer are provided on both sides of the support, these layers may be provided on just one side. In that case, a backcoat layer may be provided on the reverse side from the nonmagnetic layer and the magnetic layer to obtain effects of correcting for curling and preventing static electricity. The thickness thereof ranges from 0.1 to 4 $\mu$m, preferably from 0.3 to 2.0 $\mu$m. Known undercoating layers may be employed. Further, with the exception that it have from 200 to 1,000 protrusions having a height equal to or higher than 50 nm per 10,000 $\mu$m$^2$, a known backcoat layer may be employed.

The thickness of the magnetic layer of the medium of the present invention is optimized based on the saturation magnetization level of the head, the head gap length, and the recording signal band range. A thickness equal to or higher than 0.05 $\mu$m and equal to or less than 0.25 $\mu$m, preferably equal to or higher than 0.05 $\mu$m and equal to or less than 0.20 $\mu$m, is generally suitable. It is also possible to separate the magnetic layer into two or more layers having different magnetic characteristics. Known multiple magnetic layer structures may be employed.

The thickness of the nonmagnetic lower layer of the medium of the present invention is equal to or higher than 0.2 $\mu$m and equal to or less than 5.0 $\mu$m, preferably equal to or higher than 0.3 $\mu$m and equal to or less than 3.0 $\mu$m, and still more preferably equal to or higher than 1.0 $\mu$m and equal to or less than 2.5 $\mu$m. The lower layer of the present invention performs its function so long as it is an essentially nonmagnetic layer. For example, a lower layer into which a small quantity of magnetic material is incorporated as an impurity, or even intentionally, will still exhibit the effect of the present invention and can be considered to have essentially the same structure as the present invention. The term "essentially nonmagnetic" means that the lower layer exhibits a residual magnetic flux density equal to or less than 10 mT (100 G) or a coercive force equal to or less than 7,960 A·m²/kg (100 Oe), preferably exhibiting no residual magnetic flux density or coercive force at all.

The Backcoat Layer

Generally, in magnetic tapes for computer data recording, greater repeated running properties are demanded than is the case for videotapes and audiotapes. To maintain such high running durability, the backcoat layer preferably contains carbon black and inorganic powder.

Two types of carbon black having different average particle sizes are preferably combined for use. In that case, a microgranular carbon black with an average particle size ranging from 10 to 20 nm and a coarse-particle carbon black with an average particle size ranging from 230 to 300 nm are preferably combined for use. Generally, the addition of microgranular carbon black such as that set forth above makes it possible to set a low surface resistivity and a low light transmittance for the backcoat layer. Magnetic recording devices exploit the light transmittance of the tape, and it is often employed for operation signals. Thus, in such cases, the addition of microgranular carbon black is particularly effective. Further, microgranular carbon black generally has good liquid lubricant holding power, so that when a lubricant is used in combination, it contributes to reducing the friction coefficient. The coarse-particle carbon black with a particle size ranging from 230 to 300 nm functions as a solid lubricant and forms minute protrusions on the outer surface of the backlayer, reducing the contact surface area and contributing to a reduction in the friction coefficient. However, there is a drawback to the addition of a large quantity of coarse-particle carbon black in that it tends to contact the magnetic layer during winding of the tape and form pits therein, effectively roughening the surface of the magnetic layer and causing noise.

The following are examples of specific products of microgranular carbon black: RAVEN 2000B (18 nm), RAVEN 1500B (17 nm) (both from Columbia Carbon Co.,Ltd.); BP800 (17 nm) (from Cabot Corporation); PRINNTEX 90 (14 nm), PRINTEX 95 (15 nm), PRINTEX 85 (16 nm), and PRINTEX 75 (17 nm) (from Degusa Co.,Ltd.); and #3950 (16 nm) (from Mitsubishi Chemical Corp.).

Examples of specific products of coarse particle carbon black are Thermal Black (270 nm) (from Cancarb Limited.) and RAVEN MTP (275 nm) (from Columbia Carbon Co., Ltd.).

When two types of particle of differing average particle size are employed in the backcoat layer, the content ratio (by weight) of microgranular carbon black with an average particle size ranging from 10 to 20 nm to the coarse-particle carbon black with an average particle size ranging from 230 to 300 nm desirably falls within the range of from 98:2 to 75:25, more preferably from 95:5 to 85:15.

The content of carbon black (the total quantity when two types of carbon black are employed) in the backcoat layer normally falls within the range of from 30 to 80 weight parts, preferably from 45 to 65 weight parts, per 100 weight parts of binder.

Two inorganic powders of different hardnesses may be employed in combination. Specifically, a soft inorganic powder with a Mohs' hardness ranging from 3 to 4.5 and a hard inorganic powder with a Mohs' hardness ranging from 5 to 9 may be employed in combination.

Adding a soft inorganic powder with a Mohs' hardness ranging from 3 to 4.5 permits stabilization of the friction coefficient with repeated running. Further, at this hardness range, the slide guide poles are not worn down. The average particle size of the inorganic powder preferably ranges from 30 to 50 nm.

Examples of soft inorganic powders with a Mohs' hardnesses ranging from 3 to 4.5 are: calcium sulfate, calcium carbonate, calcium silicate, barium sulfate, magnesium carbonate, zinc carbonate, and zinc oxide. These may be employed singly or in combinations of two or more. Of these, calcium carbonate is particularly preferred.

The content of soft inorganic powder in the backcoat layer preferably ragnes from 10 to 140 weight parts, more preferably from 35 to 100 weight parts, per 100 weight parts of carbon black.

Adding a hard inorganic powder with a Mohs' hardness ranging from 5 to 9 enhances the strength of the backcoat layer and improves running durability. When these inorganic powders are employed together with the carbon black and the above-described soft inorganic powder, deterioration is reduced even with repeated sliding and a strong backcoat layer is obtained. The addition of this inorganic powder imparts a suitable degree of abrasive strength, reducing adhesion of scrapings to the tape guide poles or the like. In particular, when a soft inorganic powder (calcium carbonate being preferred) is employed in combination, the sliding characteristics of the guide poles, which have rough surfaces, are improved and the friction coefficient of the backcoat layer can be stabilized.

The hard inorganic powder preferably has an average particle size ranging from 80 to 250 nm (more preferably from 100 to 210 nm).

Examples of hard inorganic powders with a Mohs' hardnesses ranging from 5 to 9 are α-iron oxide, α-alumina, and chromium oxide ($Cr_2O_3$). These powders may be used singly or in combination. Of these, α-iron oxide or α-alumina is preferred. The content of the hard inorganic powder normally ranges from 3 to 30 weight parts, preferably from 3 to 20 weight parts, per 100 weight parts of carbon black.

When the above-described soft inorganic powder and hard inorganic powder are employed in the backcoat layer, the soft inorganic powder and the hard inorganic powder are preferably selected so that there is a difference in hardness between the soft inorganic powder and the hard inorganic powder equal to or higher than 2 (preferably, equal to or higher than 2.5, more preferably, equal to or higher than 3).

The backcoat layer can comprise the above-described two types of organic powders of prescribed average particle size and different Mohs' hardnesses and the above-described two types of carbon black of different average particle sizes. In particular, calcium carbonate is desirably incorporated into this combination as the soft inorganic powder.

A lubricant can be incorporated into the backcoat layer. The lubricant may be suitably selected from among the lubricants given as examples of lubricants employed in the nonmagnetic layer or magnetic layer above. The lubricant is normally added to the backcoat layer in a range of from 1 to 5 weight parts per 100 weight parts of binder.

Support

It suffices for the nonmagnetic support employed in the present invention to have a thickness equal to or less than 5.5 μm and a Young's modulus in the MD direction equal to or higher than 11,000 Mpa. Known films in the form of polyesters such as polyethylene terephthalate and polyethylene naphthalate, polyolefins, cellulose triacetate, polycarbonates, polyamides, polyimides, polyamidoimides, polysulfones, polyaramid, aromatic polyamides, polybenzoxazoles, and the like may be employed. High-strength supports such as polyethylene naphthalate and polyamide are preferably used. As needed, stacked supports such as are disclosed in Japanese Unexamined Patent Publication (KOKAI) Heisei No. 3-224127 may be employed to vary the surface roughness of the magnetic surface and base surface. These supports may be subjected beforehand to corona discharge treatment, plasma treatment, adhesion enhancing treatment, heat treatment, dust removal, and the like.

As needed, the coarseness of the shape of the surface of the nonmagnetic support may be controlled through the size and quantity of filler that is added to the support. Examples of such fillers are oxides and carbonates of Ca, Si, Ti, and the like, as well as organic powders such as acrylics. A maximum height SRmax of the support equal to or less than 1 $\mu$m, a ten-point average roughness SRz equal to or less than 0.5 $\mu$m, a center surface peak height SRp equal to or less than 0.5 $\mu$m, a center surface valley depth SRv equal to or less than 0.5 $\mu$m, a center surface area ratio SSr equal to or higher than 10 percent and equal to or less than 90 percent, and an average wavelength S$\lambda$a equal to or higher than 5 $\mu$m and equal to or less than 300 $\mu$m are preferred. The surface protrusion distribution of these supports may be controlled as desired with fillers to achieve desired electromagnetic characteristics and durability. Those having a magnitude ranging from 0.01 to 1 $\mu$m may be controlled to within the range of from 0 to 2000 pieces per 0.1 mm$^2$.

The F-5 value of the nonmagnetic support employed in the present invention preferably ranges from 5 to 50 kg/mm$^2$ and the thermal shrinkage rate of the support after 30 minutes at 100° C. is preferably equal to or less than 3 percent, more preferably equal to or less than 1.5 percent. The thermal shrinkage rate after 30 min at 80° C. is equal to or less than 1 percent, preferably equal to or less than 0.5 percent. A breaking strength ranging from 5 to 100 kg/mm$^2$ and a modulus of elasticity ranging from 100 to 2,000 kg/mm$^2$ are preferred. The coefficient of thermal expansion ranges from $10^{-4}$ to $10^{-8}$/° C., preferably from $10^{-5}$ to $10^{-6}$/° C. The coefficient of moisture expansion is equal to or less than $10^{-4}$/RH percent, preferably equal to or less than $10^{-5}$/RH percent. These thermal characteristics, dimensional characteristics, and mechanical strength characteristics are preferably nearly equal, differing by equal to or less than 10 percent in any direction within the surface of the support.

Manufacturing Method

The process for manufacturing the magnetic coating material of the magnetic recording medium of the present invention comprises at least a kneading step, a dispersing step, and a mixing step, to be carried out, if necessary, before and/or after the kneading and dispersing steps. Each of the individual steps may be divided into two or more stages. All of the starting materials employed in the present invention, including the ferromagnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, the polyurethane may be divided up and added in the kneading step, the dispersing step, and the mixing step for viscosity adjustment after dispersion. To achieve the object of the present invention, conventionally manufacturing techniques may be utilized for some of the steps. A kneader having a strong kneading force, such as an open kneader, continuous kneader, pressure kneader, or extruder is preferably employed in the kneading step. When a kneader is employed, the magnetic powder or nonmagnetic powder and all or part of the binder (preferably equal to or higher than 30 percent of the entire quantity of binder) are kneaded in a range of from 15 to 500 parts per 100 parts of magnetic powder. Details of the kneading process are described in Japanese Unexamined Patent Publication (KOKAI) Heisei Nos. 1-106338 and Hei 1-79274. Further, glass beads may be employed to disperse the magnetic layer solution and nonmagnetic layer solution, with a dispersing medium with a high specific gravity such as zirconia beads, titania beads, and steel beads being suitable for use. The particle diameter and filling ratio of these dispersing media are optimized for use. A known dispersing device may be employed.

The backcoat layer can be prepared by coating a backcoat layer forming coating material comprising granular components such as an abrasive and antistatic agent, and binder dispersed in solvent on the reverse surface from the magnetic layer. In the manner of the above-described preferred modes, since adequate dispersability can be ensured by employing a larger quantity of granular oxides than carbon black, the backcoat layer forming coating material can be prepared without the roll kneading that is conventionally required. Reducing the carbon black content makes it possible to reduce the amount of residual cyclohexane following drying even when using cyclohexane as a solvent.

The application method may be selected based on the objective from among the methods employed for the magnetic coating material, described further below.

The surface of the backcoat layer can be adjusted to a desired roughness, for example, by varying the size and quantity added of granular components such as carbon black and the abrasives employed. Employing a thin backcoat layer promotes protrusion of granular components onto the surface and permits roughening of the surface. It is also possible to achieve a desired surface roughness by adjusting the state of dispersion of the backcoat solution, and the surface can be rendered smooth by intensifying the calender processing conditions conducted during preparation of the medium.

Methods such as the following are desirably employed when coating the multilayer structure magnetic recording medium in the present invention. In the first method, the lower layer is first applied with a coating device commonly employed to apply magnetic coating solutions such as a gravure coating, roll coating, blade coating, or extrusion coating device, and the upper layer is applied while the lower layer is still wet by means of a support pressure extrusion coating device such as is disclosed in Japanese Examined Patent Publication (KOKOKU) Heisei No. 1-46186 and Japanese Unexamined Patent Publication (KOKAI) Showa No.60-238179 and Japanese Unexamined Patent Publication (KOKAI) Heisei No.2-265672. In the second method, the upper and lower layers are applied nearly simultaneously by a single coating head having two built-in slits for passing coating solution, such as is disclosed in Japanese Unexamined Patent Publication (KOKAI) Showa No. 63-88080, Japanese Unexamined Patent Publication (KOKAI) Heisei No. 2-17971, and Japanese Unexamined Patent Publication (KOKAI) Heisei No.2-265672. In the third method, the upper and lower layers are applied nearly simultaneously using an extrusion coating apparatus with a backup roller as disclosed in Japanese Unexamined Patent Publication (KOKAI) Heisei No. 2-174965. To avoid compromising the electromagnetic characteristics or the like of the magnetic recording medium by aggregation of magnetic powder, shear is desirably imparted to the coating solution in the coating head by a method such as disclosed in Japanese Unexamined Patent Publication (KOKAI) Showa No. 62-95174 or Japanese Unexamined Patent Publication (KOKAI) Heisei No.1-236968. In addition, the viscosity of the coating solution must satisfy the numerical range specified in Japanese Unexamined Patent Publication (KOKAI) Heisei No. 3-8471. Applying the lower layer, drying it, and then applying the magnetic layer thereover in a sequential multilayer application to achieve the structure of the present invention is also possible, and does not compromise the effect of the present invention. However, to reduce the number of defects in the coating and improve the quality of dropout and the like, the above-described simultaneous multilayer coating is preferred.

Magnetic tapes are oriented in the longitudinal direction with a cobalt magnet or a solenoid. The temperature and flow rate of the hot air used for drying and the coating speed are desirably controlled to control which portion of the coating is dried. The coating rate desirably ranges from 20 to 1,000 m/min and the temperature of the hot air used for drying is desirably equal to or higher than 60° C. Further, suitable predrying may be conducted prior to entry into the magnetic zone.

Heat-resistant plastic rollers of epoxy, polyimide, polyamide, polyimidoamide or the like are employed as calender processing rollers. Processing may also be conducted with metal rollers. Processing with a pair of metal rollers is particularly desirable when forming a magnetic layer on two sides. The processing temperature is preferably equal to or higher than 50° C., more preferably equal to or higher than 100° C. Linear pressure is desirably equal to or higher than 200 kg/cm, more preferably equal to or higher than 300 kg/cm.

Physical Characteristics

The saturation magnetic flux density of the magnetic layer of the magnetic recording medium of the present invention, when employing a ferromagnetic metal powder, is equal to or higher than 200 mT (2,000 G) and equal to or less than 500 mT (5,000 G), and when employing hexagonal ferrite, equal to or higher than 100 mT (1,000 G) and equal to or less than 300 mT (3,000 G). Coercive forces Hc and Hr are equal to or higher than 119 kA/m (1,500 Oe) and equal to or less than 398 kA/m (5,000 Oe), and more preferably, equal to or higher than 143 kA/m (1,800 Oe) and equal to or less than 239 kA/m (3,000 Oe). The coercive force distribution is preferably narrow, with SFD and SFDr being equal to or less than 0.6.

Squareness is equal to or higher than 0.7, preferably equal to or higher than 0.8. The friction coefficient of the magnetic recording medium of the present invention relative to the head is equal to or less than 0.5 and preferably equal to or less than 0.3 at temperatures ranging from −10° C. to 40° C. and humidity ranging from 0 percent to 95 percent. The surface resistivity desirably ranges from $10^4$ to $10^{12}$ Ω/sq on the magnetic surface. The charge potential preferably ranges from −500 V to +500 V. The modulus of elasticity at 0.5 percent extension of the magnetic layer desirably ranges from 100 to 2,000 kg/mm² in all in-plane directions. The breaking strength desirably ranges from 10 to 70 kg/mm². The modulus of elasticity of the magnetic recording medium desirably ranges from 100 to 1,500 kg/mm² in all in-plane directions. The residual elongation is desirably equal to or less than 0.5 percent, and the thermal shrinkage rate at all temperatures below 100° C. is preferably equal to or less than 0.1 percent, more preferably equal to or less than 0.5 percent, and most preferably equal to or less than 0.1 percent. The glass transition temperature of the magnetic layer (i.e., the temperature at which the loss elastic modulus of dynamic viscoelasticity peaks as measured at 110 Hz) of the magnetic layer is preferably equal to or higher than 50° C. and equal to or less than 120° C., and that of the lower nonmagnetic layer preferably ranges from 0° C. to 100° C. The loss elastic modulus preferably falls within a range of from $1 \times 10^3$ to $8 \times 10^4$ N/cm² ($1 \times 10^8$ to $8 \times 10^9$ dyne/cm²) and the loss tangent is preferably equal to or less than 0.2. Adhesion failure tends to occur when the loss tangent becomes excessively large. These thermal characteristics and mechanical characteristics are desirably nearly identical, varying by equal to or less than 10 percent, in all in-plane directions of the medium. The residual solvent in the magnetic layer is preferably equal to or less than 100 mg/m² and more preferably equal to or less than 10 mg/m². The void ratio in the coated layers, including both nonmagnetic lower layer and magnetic upper layer, is preferably equal to or less than 30 volume percent, more preferably equal to or less than 20 volume percent. Although a low void ratio is preferable for attaining high output, there are some cases in which it is better to ensure a certain level. For example, in magnetic recording media for data recording where repeat applications are important, higher void ratios often result in better running durability. Curling is preferably within ±3 mm.

When there is both a nonmagnetic layer and a magnetic layer in the magnetic recording medium of the present invention, it will be readily understood that the physical characteristics of the nonmagnetic layer and the magnetic layer can be changed based on the objective. For example, the magnetic layer can be imparted with a high modulus of elasticity to improve running durability while at the same time imparting to the lower layer a lower modulus of elasticity than that of the magnetic layer to improve head contact with the magnetic recording medium.

Embodiments

Embodiment of the present invention are described below.
<Manufacturing Of Coating Materials>

---

Magnetic Coating Material ML-1
(employing acicular magnetic powder)

| | |
|---|---:|
| Ferromagnetic metal powder: M-1 | 100 parts |
| Composition: Co/Fe (atomic ratio) 30 percent | |
| HC 188 kA/m | |
| Specific surface area 49 m²/g | |
| σ s 146 Am²/kg | |
| Crystalline size 170 Å | |
| Major axis length 0.100 µm | |
| Acicular ratio 6 | |
| SFD 0.51 | |
| Sintering prevention agent Al compound | |
| (Al/Fe atomic ratio 5 percent) | |
| pH 9.4 | |
| Y compound (Y/Fe atomic ratio 5 percent) | |
| Vinyl chloride copolymer | 10 parts |
| MR110 (from Nippon Zeon Co., Ltd.) | |
| Polyurethane resin | 4 parts |
| UR5500 (from Toyobo Co., Ltd.) | |
| α-Alumina | 10 parts |
| HIT70 (from Sumitomo Chemical Co., Ltd.) | |
| Carbon black | 1 part |
| #50 (from Asahi Carbon Co., Ltd.) | |
| Phenylphosphonic acid | 3 parts |
| Oleic acid | 1 part |
| Stearic acid | 0.6 part |
| Ethyleneglycol dioleyl | 12 parts |
| Methyl ethyl ketone | 180 parts |
| Cyclohexanone | 180 parts |

Magnetic Coating Material ML-2
(Acicular magnetic power employed:
Comparative example)

| | |
|---|---:|
| Ferromagnetic metal powder: M-2 | 100 parts |
| Composition: Fe:Ni = 96:4 | |
| Hc 127 kA/m | |
| Specific surface area 45 m²/g | |
| Crystalline size: 220 Å | |
| σ s 135 Am²/kg | |
| Major axis length 0.20 µm | |
| Acicular ratio 9 | |

-continued

| | |
|---|---|
| Vinyl chloride copolymer MR110 (from Nippon Zeon Co., Ltd.) | 12 parts |
| Polyurethane resin UR8600 (from Toyobo Co., Ltd.) | 5 parts |
| α-Alumina (particle size 0.65 μm) | 2 parts |
| Chromium oxide (particle size 0.35 μm) | 5 parts |
| Carbon black (particle size 0.03 μm) | 2 parts |
| Carbon black (particle size 0.3 μm) | 9 parts |
| Isohexadecyl stearate | 4 parts |
| n-Butyl stearate | 4 parts |
| Butoxyethyl stearate | 4 parts |
| Oleic acid | 1 part |
| Stearic acid | 1 part |
| Methyl ethyl ketone | 300 parts |
| Magnetic Coating Material 3 (Hexagonal Ferrite: Tape BL-1) | |
| Barium ferrite magnetic powder Plate diameter 0.03 μm Plate ratio 3 Hc: 196 kA/m (2,460 Oe) | 100 parts |
| Vinyl chloride copolymer MR555 (from Nippon Zeon CO., Ltd.) | 6 parts |
| Polyurethane resin [sic] UR8200 (from Toyobo Co., Ltd.) | 3 parts 3 parts |
| α-Alumina (particle size 0.3 μm) HIT55 (from Sumitomo Chemical Co., Ltd.) | 2 parts |
| Carbon black (particle size 0.015 μm) #55 (from Asahi Carbon Co., Ltd.) | 5 parts |
| Butyl stearate | 1 part |
| Stearic acid | 2 parts |
| Methyl ethyl ketone | 125 parts |
| Cyclohexanone | 125 parts |
| Nonmagnetic Coating Material NU-1 (acicular inorganic powder employed) | |
| Nonmagnetic powder α-Fe₂O₃ (hematite) Major axis length 0.15 μm BET specific surface area 50 m²/g pH 9 Al₂O₃ present on surface at 8 weight percent of total particles | 80 parts |
| Carbon black Conductex SC-U (from Columbia Carbon Co., Ltd.) | 20 parts |
| Vinyl chloride copolymer MR110 (from Nippon Zeon Co., Ltd.) | 12 parts |
| Polyurethane resin UR8200 (from Toyobo Co., Ltd.) | 5 parts |
| Phenylphosphonic acid | 4 parts |
| Butyl stearate | 10 parts |
| Butoxyethyl stearate | 5 parts |
| Isohexadecyl stearate | 2 parts |
| Stearic acid | 3 parts |
| Methyl ethyl ketone/cyclohexanone (8/2 mixed solvent) | 250 parts |
| Support BA-1 Polyaramid Thickness 3.7μ Young's modulus | |

MD 12,000 MPa
TD 15,000 MPa
Support BA-2 Polyaramid
Thickness 4.4μ
Young's modulus MD 11,000 MPa
TD 14,000 MPa
Support BA-3 PEN
Thickness 4.5μ
Young's modulus MD 6,900 MPa
TD 7,150 MPa Following orientation in the longitudinal direction with an oriented rare earth magnet, orientation was conducted in the longitudinal direction with a solenoid.

| Backcoat Layer BB-1 | |
|---|---|
| Microgranular carbon black powder (From Cabot Corporation, BP-800, mean particle size: 17 nm) | 100 parts |
| Coarse particle carbon black powder (From Cancarb Limited., thermal black, mean particle size: 270 nm) | 3.2 parts |
| α-Alumina (hard inorganic powder) (Mean particle size: 200 nm, Mohs' hardness: 9) | 0.5 parts |
| Nitrocellulose resin | 140 parts |
| Polyurethane resin | 15 parts |
| Polyisocyanate | 40 parts |
| Polyester resin | 5 parts |
| Dispersing agents: | |
| Copper oleate | 5 parts |
| Copper phthalocyanine | 5 parts |
| Barium sulfate | 5 parts |
| Methyl ethyl ketone | 2,200 parts |
| Butyl acetate | 300 parts |
| Toluene | 600 parts |
| Backcoat Layer BB-2 | |
| Microgranular carbon black powder (From Cabot Corporation, BP-800, mean particle size: 17 nm) | 100 parts |
| Coarse-particle carbon black powder (From Cancarb Limited., thermal black, mean particle size: 270 nm) | 10 parts |
| Calcium carbonate (soft inorganic powder) (From Shiraishi Kogyo Co., Ltd., Hakuenka 0, mean particle size: 40 nm, Mohs' hardness: 3) | 80 parts |
| α-Alumina (hard inorganic powder) (Mean particle size: 200 nm, Mohs' hardness: 9) | 5 parts |
| Nitrocellulose resin | 140 parts |
| Polyurethane resin | 15 parts |
| Polyisocyanate | 40 parts |
| Polyester resin | 5 parts |
| Dispersing agents: | |
| Copper oleate | 5 parts |
| Copper phthalocyanine | 5 parts |
| Barium Sulfate | 5 parts |
| Methyl ethyl ketone | 2,200 parts |
| Butyl acetate | 300 parts |
| Toluene | 600 parts |
| Backcoat Layer Coating Material BB-3 | |
| Microgranular carbon black powder (From Cabot Corporation, BP-800, mean particle size: 17 nm) | 100 parts |
| Coarse particle carbon black powder (From Cancarb Limited., thermal black, mean particle size 270 nm) | 2 parts |
| Nitrocellulose resin | 140 parts |
| Polyurethane resin | 15 parts |
| Polyisocyanate | 40 parts |
| Polyester resin | 5 parts |
| Dispersing agents: | |
| Copper oleate | 5 parts |
| Copper phthalocyanine | 5 parts |
| Barium Sulfate | 5 parts |
| Methyl ethyl ketone | 2,200 parts |
| Butyl acetate | 300 parts |
| Toluene | 600 parts |

After kneading the above-stated components forming the backcoat layers in a continuous kneader, dispersion was conducted with a sandmill. The dispersions obtained were filtered with a filter having a mean pore diameter of 1 μm to prepare backcoat layer forming coating solutions.

Manufacturing Method 1

After kneading the components of the above-described magnetic coating materials and lower layer nonmagnetic coating materials in kneaders, dispersion was conducted with sandmills. Polyisocyanate was added to the dispersions obtained, 2.5 parts to that of the nonmagnetic layer coating solution and 3 parts to that of the magnetic layer coating solution. Forty parts of cyclohexanone were then added to each and the mixtures were filtered with filters having a mean pore diameter of 1 µm to prepare coating solutions for formation of the nonmagnetic layer and the magnetic layer.

The nonmagnetic layer coating solution obtained was coated, and immediately thereafter, the magnetic layer was coated thereover in simultaneous multilayer coating of the support. While both layers were still wet, they were oriented with a cobalt magnet having a magnetic force of 6,000 G and a solenoid having a magnetic force of 600 mT (6,000 G). After drying, a seven-stage calender configured of only metal rolls was used to process the product at a temperature of 85° C. and a speed of 200 m/min. Subsequently, a backcoat layer was applied to a thickness of 0.5 µm. Slits 3.8 mm in width were formed. The surface of the magnetic layer was then cleaned with a tape cleaning device in which a nonwoven fabric and a razor blade were mounted so as to press against the magnetic surface on a device having a feeding and winding mechanism for slitted products. The magnetic tape obtained was then assembled into a DDS cartridge. In the course of changing the thickness of the support and the magnetic layer, the coating thickness of the lower nonmagnetic layer was adjusted to yield a tape 6.0 µm in thickness.

The nonmagnetic layer coating solution obtained was applied on the support, dried briefly, and calendered, after which the magnetic layer was applied thereover with a blade system, and orientation was conducted with a cobalt magnet having a magnetic force of 600 mT (6,000 G) and a solenoid having a magnetic force of 600 mT (6,000 G). Thereafter, manufacturing was identical to Manufacturing Method 1. It is also possible not to calender the nonmagnetic layer.

The magnetic characteristics, average center-surface roughness, surface recording density, and the like, of samples obtained by suitably combining as shown in Tables 1–4 the various methods set forth above were measured.

(1) Magnetic characteristics (Hc): Measured at Hm 10 KOe with a vibrating sample magnetometer (from Toei Kogyo Co.,Ltd.).

(2) The surface recording density was obtained by multiplying the linear recording density by the track density.

(3) The linear recording density was the number of bits of signal recorded per inch in the direction of recording.

(4) The track density was the number of tracks per inch.

(5) $\Phi$m is the level of magnetization per unit surface area of the magnetic recording medium, and was obtained by multiplying Bm (Gauss) by the thickness. This was measured at Hm 796 kA/m (10 kOe) with a vibrating sample magnetometer (from Toei Kogyo Co.,Ltd.) and is a value that can be directly measured.

(6) Surface protrusion number: Using a Nanoscope III from Digital Instruments Co., a sample area of 100× 100 µm was measured, using a reference surface in the form of a surface in which the volume of protrusions and the volume of indentations were equal, and the number of protrusions present in the surface when sliced at a random height was counted.

(7) For the magnetic layer thickness, a diamond cutter was used to cut the magnetic recording medium in the longitudinal direction to a depth of about 0.1 µm, this area was observed with a transmission electron microscope at a magnification ranging from 10,000 to 100,000-fold, preferably from 20,000 to 50,000-fold, and photographed. The print size of the photographs was A4 to A5. Subsequently, differences in shape between the ferromagnetic powder in the magnetic layer and nonmagnetic powder in the lower nonmagnetic layer were observed to visually determine the interface, which was marked in black. The surface of the magnetic layer was also marked in black. Subsequently, an Image Processor KS400 from Zeiss Co. was used to measure the length of the lines marked in black. When the length of the sample photograph was 21 cm, the measurement was conducted 85 to 300 times. The average value of these measurements was denoted as d and the standard deviation of the measured values as σ. The value d is calculated as described in Japanese Unexamined Patent Publication (KOKAI) Heisei No. 5-298653, and σ was calculated from Equation 2. The value di denotes individual measurement values, and n denotes 85 to 300.

(8) CN Ratio: Measured by mounting a recording head (MIG, gap 0.15 µm, 1.8 T) and a reproduction MR head on a drum tester. The noise was measured as the modulation noise at a head-media relative speed ranging from 1 to 3 m/min.

(9) As regards durability, the no. 8 guide of the back-surface touch was removed from a DDS4 drive from SONY, a tape was positioned at a lap angle of 90° at 23° C. and 70 percent RH, the back surface was made to run with a load of 10 g, and the Euler equation was used to calculate the friction coefficient from the change in tension at that time. The number of running passes was 500.

TABLE 1

| Sample | | Magnetic Layer | Thickness of Magnetic Layer (µm) | Magnetic Layer Hc (kA/m) | Support | Back Layer | Number of Protrusions Greater than 50 nm on Back Surface | Linear Recording Density kfci | Track Density tpi | Surface Recording Density (GB/inch²) | C/N | Back Surface µ Value One Pass | Back Surface µ Value 500 Passes |
|---|---|---|---|---|---|---|---|---|---|---|---|---|---|
| T1 | Embodiment | ML1 | 0.15 | 189 | BA1 | BB1 | 812 | 140 | 5,000 | 0.70 | 0.0 | 0.15 | 0.22 |
| T2 | Embodiment | ML1 | 0.15 | 190 | BA2 | BB1 | 950 | 140 | 5,000 | 0.70 | −0.2 | 0.14 | 0.23 |
| T3 | Embodiment | ML1 | 0.15 | 188 | BA2 | BB1 | 933 | 140 | 4,000 | 0.40 | 3.3 | 0.14 | 0.20 |
| T4 | Comp. Ex. | ML2 | 0.15 | 127 | BA1 | BB1 | 796 | 140 | 5,000 | 0.70 | −3.9 | 0.16 | 0.21 |

TABLE 1-continued

| Sample | | Magnetic Layer | Thickness of Magnetic Layer (μm) | Magnetic Layer Hc (kA/m) | Support | Back Layer | Number of Protrusions Greater than 50 nm on Back Surface | Linear Recording Density kfci | Track Density tpi | Surface Recording Density (GB/inch²) | C/N | Back Surface μ Value One Pass | Back Surface μ Value 500 Passes |
|---|---|---|---|---|---|---|---|---|---|---|---|---|---|
| T5 | Embodiment | ML1 | 0.30 | 185 | BA1 | BB1 | 806 | 140 | 5,000 | 0.70 | −1.3 | 0.14 | 0.24 |
| T6 | Comp. Ex. | ML1 | 0.15 | 188 | BA1 | BB2 | 1218 | 140 | 5,000 | 0.70 | −1.7 | 0.15 | 0.19 |
| T7 | Comp. Ex. | ML1 | 0.15 | 187 | BA1 | BB3 | 189 | 140 | 5,000 | 0.70 | 0.3 | 0.22 | adhered |
| T8 | Comp. Ex. | ML1 | 0.15 | 189 | BA3 | BB1 | 971 | 140 | 5,000 | 0.70 | −2.9 | 0.14 | 0.45 |
| T9 | Embodiment | BL1 | 0.15 | 195 | BA1 | BB1 | 844 | 140 | 5,000 | 0.70 | −0.5 | 0.16 | 0.23 |
| T10 | Comp. Ex. | BL1 | 0.15 | 195 | BA1 | BB2 | 1025 | 140 | 5,000 | 0.70 | −1.5 | 0.15 | 0.21 |
| T11 | Comp. Ex. | BL1 | 0.15 | 194 | BA1 | BB3 | 191 | 140 | 5,000 | 0.70 | −0.1 | 0.19 | adhered |
| T12 | Comp. Ex. | BL1 | 0.15 | 195 | BA3 | BB1 | 957 | 140 | 5,000 | 0.70 | −3.3 | 0.16 | 0.43 |

In the evaluation results given in the table above, a high C/N ratio was desirable, with equal to or less than −1.5 dB being unsuitable. A friction coefficient that was low for both one pass and 500 passes was desirable; a low friction coefficient for one pass that became high for 500 passes was judged to lack durability. A friction coefficient that was less than 0.25 was basically determined to be good.

Samples T1 to T3, T5, and T9 had C/N ratios equal to or higher than −1.4 dB, friction coefficients of less than 0.25 for both one pass and 500 passes, improved C/N ratios in the high-density recording region, good backcoat layer durability, and improved running durability.

In a magnetic recording medium in which an essentially nonmagnetic lower layer and a magnetic layer comprising a ferromagnetic metal powder or a ferromagnetic hexagonal ferrite powder dispersed in binder and having a coercive force equal to or higher than 143 kA/m are provided in that order on a support, by imparting to said support a thickness equal to or less than 5.5 μm and a Young's modulus in the MD direction equal to or higher than 11,000 Mpa, and by providing a backcoat layer on said support on the reverse surface from said magnetic layer on said support, said backcoat layer having not fewer than 200 and not more than 1,000 protrusions having a height equal to or higher than 50 nm per 10,000 μm², it is possible to provide a magnetic recording medium that records signals at a surface recording density ranging from 0.2 to 2 Gbit/inch², and that both exhibits an improved C/N even in the high-density recording region and also has good durability. The present disclosure relates to the subject matter contained in Japanese Patent Application No. 2000-222699 filed on Jul. 24, 2000, which is expressly incorporated herein by reference in its entirety.

What is claimed is:

1. A magnetic recording medium comprising a nonmagnetic lower layer and a magnetic layer provided in this order on a support wherein said magnetic layer comprises a ferromagnetic metal powder or a ferromagnetic hexagonal ferrite powder and a binder and has a coercive force equal to or higher than 143 kA/m, wherein said magnetic recording medium is a medium for recording signals having a surface recording density ranging from 0.2 to 2 Gbit/inch², said support has a thickness equal to or less than 5.5 μm and a Young's modulus in the MD direction equal to or higher than 11,000 Mpa, and said support has on the reverse surface from said magnetic layer a backcoat layer, said backcoat layer having not fewer than 200 and not more than 1,000 protrusions having a height equal to or higher than 50 nm per 10,000 μm².

2. The magnetic recording medium of claim 1, wherein said magnetic layer has a dry thickness ranging from 0.05 to 0.25 μm.

3. The magnetic recording medium of claim 1, wherein said magnetic layer has $\Phi m$ ranging from $1.0 \times 10^{-5}$ to $1.3 \times 10^{-5}$ T.

4. The magnetic recording medium of claim 1, wherein said lower layer and/or magnetic layer comprises at least a fatty acid and a fatty acid ester.

5. The magnetic recording medium of claim 1, wherein said magnetic recording medium is used for recording signals at a surface recording density ranging from 0.35 to 2 Gbit/inch².

6. The magnetic recording medium of claim 1, wherein said lower layer comprises an inorganic powder with a Mohs' hardness equal to or higher than 4.

* * * * *